(12) United States Patent
Nagami

(10) Patent No.: US 6,902,677 B2
(45) Date of Patent: Jun. 7, 2005

(54) METHOD OF REMOVING METAL ION AND APPARATUS FOR TREATING SUBSTRATE

(75) Inventor: Shuzo Nagami, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 70 days.

(21) Appl. No.: 10/668,551

(22) Filed: Sep. 22, 2003

(65) Prior Publication Data

US 2004/0055967 A1 Mar. 25, 2004

(30) Foreign Application Priority Data

Sep. 24, 2002 (JP) .................................. 2002-277283
Jul. 25, 2003 (JP) .................................. 2003-201762

(51) Int. Cl.$^7$ .............................. C25C 1/12; C02F 1/461

(52) U.S. Cl. .................... 210/748; 134/1.3; 204/275.1; 205/771

(58) Field of Search .................................. 210/748, 757, 210/198.1, 243, 900; 134/1.3, 902; 204/275.1; 205/750, 771, 772

(56) References Cited

U.S. PATENT DOCUMENTS

| 4,187,166 A | * | 2/1980 | Kruper | 205/100 |
| 4,337,129 A | * | 6/1982 | Soboroff et al. | 205/747 |
| 4,545,877 A | * | 10/1985 | Hillis | 216/84 |
| 4,755,265 A | * | 7/1988 | Young | 205/234 |
| 4,857,159 A | * | 8/1989 | Davis et al. | 205/510 |
| 6,001,238 A | * | 12/1999 | Takayasu et al. | 205/742 |
| 6,332,973 B1 | * | 12/2001 | Stice | 205/772 |
| 2002/0185446 A1 | * | 12/2002 | Johnny | 210/709 |

FOREIGN PATENT DOCUMENTS

| JP | 06-204201 | 7/1994 |
| JP | 2739419 | 1/1998 |

* cited by examiner

Primary Examiner—Frank M. Lawrence
(74) Attorney, Agent, or Firm—Ostrolenk, Faber, Gerb & Soffen, LLP (57) ABSTRACT

A method of removing a metal ion from a treating liquid for use in treating a substrate comprises the steps of: applying a first voltage via an electrode to the treating liquid that flows in a supply piping so that deposition can occur; and applying a second voltage higher than the first voltage to the electrode while distributing a cleaning liquid to the supply piping, so that ionization can occur.

20 Claims, 7 Drawing Sheets

METHOD OF REMOVING METAL ION AND APPARATUS FOR TREATING SUBSTRATE

BACKGROUND OF THE INVENTION

1. Field of the Invention

The invention relates to a method of removing a metal ion from a treating liquid for use in treating a substrate such as a semiconductor wafer and a glass substrate for use in a liquid crystal display (hereinafter simply referred to as "a substrate") and to an apparatus for treating a substrate.

2. Description of the Related Art

For example, a conventional type of the apparatus for treating a substrate comprises a treating vessel for storing a treating liquid and receiving the substrate to be treated; a recovery vessel for recovering the treating liquid that overflows from the treating vessel; and a supply piping with which the treating vessel and the recovery vessel are connected and communicated (for example, Japanese Patent No. 2739419).

In the apparatus in such a configuration, the treating liquid can be recycled and reused, so that the amount of the consumed treating liquid can be reduced.

However, the conventional apparatus in such a configuration has a problem as described below.

In the conventional apparatus, metal ions can intrude into the treating liquid and be circulated, so that they can adhere to the substrate and precipitate as the metal on the surface of the substrate.

The apparatus for treating the substrate may have a system in which the treating liquid recovered into the recovery vessel is not circulated but discharged. Even in such an apparatus, the metal ions can intrude into the treating liquid, so that the same problem as described above can be created.

SUMMARY OF THE INVENTION

The invention has been made in light of the above problems. It is therefore an object of the invention to provide a method of removing a metal ion and an apparatus for treating a substrate, each of which uses an oxidation-reduction reaction to recover and remove the metal ion from the treating liquid so that an adverse effect on the substrate can be prevented.

The invention is constituted as stated below to achieve the above object.

The invention is directed to a method of removing a metal ion from a treating liquid for use in treating a substrate, which comprises the steps of:

applying a first voltage via an electrode to the treating liquid that flows in a supply piping, so that deposition can occur (the deposition step); and applying a second voltage higher than the first voltage to the electrode while distributing a cleaning liquid to the supply piping, so that ionization can occur (the ionization step).

In the deposition step, the first voltage is applied via the electrode to the treating liquid so that a reduction reaction of the metal ion occurs and the metal ion in the treating liquid is reduced to the metal, which is deposited on the electrode. In the ionization step, the second voltage higher than the first voltage is applied while the cleaning liquid is distributed so that the metal deposited on the electrode is oxidized to the metal ion. The ionized metal can leave the electrode and be allowed to flow away. Thus, the metal ion can be recovered and removed from the treating liquid, and therefore, the metal ion can be prevented from having an adverse effect on the substrate.

In the invention, the cleaning liquid is preferably an acid liquid having a high oxidation-reduction potential.

The distribution of the acid cleaning liquid having a high oxidation-reduction potential can facilitate the ionization of the metal deposited on the electrode.

Examples of the acid cleaning liquid having a high oxidation-reduction potential include an acid such as hydrochloric acid and ozone water.

In the invention, the first voltage is preferably set so as to provide an inter-electrode potential higher than 0 E/V vs. NHE, and the first voltage is preferably set so as to provide an electric potential lower than the standard potential of the metal to be deposited, and the second voltage is preferably set so as to provide an electric potential higher than the standard potential of the deposited metal.

If the first voltage is higher than the inter-electrode potential of 0 E/V vs. NHE (Normal Hydrogen Electrode) and lower than the standard potential of the metal to be deposited (such as copper (Cu)), the metal such as copper (Cu) can be deposited. If the second voltage applied is higher than the standard potential of copper, the deposited copper can be oxidized to the ion. If a voltage applied is further lower than the first voltage, a complex constituted of the metal ion can also be reduced, so that the metal ion can be removed at an increased removal rate. Otherwise, such a complex would generally be hard to reduce.

The invention is also directed to an apparatus for treating a substrate, in which a treating liquid is supplied to the substrate to be treated and which comprises the following elements:

a supply piping for supplying the treating liquid to the substrate;

first supply means for supplying the treating liquid to the supply piping;

second supply means for supplying a cleaning liquid to the supply piping; and an electrode for applying a voltage to the treating liquid in the supply piping, wherein a first voltage is applied via the electrode to the treating liquid that is supplied from the first supply means to the supply piping, and then a second voltage higher than the first voltage is applied to the electrode while the cleaning liquid is distributed from the second supply means to the supply piping.

When the treating liquid is supplied from the first supply means, the first voltage is applied via the electrode to the treating liquid so that a reduction reaction can occur and a metal ion in the treating liquid can be deposited as the metal on the electrode. Next, the second voltage higher than the first voltage is applied while the cleaning liquid is supplied from the second supply means so that the metal on the electrode can be oxidized to the ion and the metal leaving the electrode can be discharged. Thus, the metal ion can be recovered and removed from the treating liquid, and therefore, the metal ion can be prevented from having an adverse effect on the substrate.

In a preferred mode of the invention, the supply piping branches into a plurality of branch pipes, in each of which the electrode is provided.

Such provided electrodes can raise the flow resistance, but the plurality of the branch pipes each having the electrode can provide sufficient quantity of flow.

In another preferred mode of the invention, the apparatus further comprises a treating vessel connected and communicated with the supply piping, in which the substrate is to be immersed, wherein the electrode is placed in the supply piping.

In the treating vessel, more substrates can be immersed and treated at the same time in a batch manner.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIGS. 3A and 3B are drawings showing a schematic configuration of an oxidation-reduction unit, and specifically.

FIGS. 8A and 8B are diagrams showing a modification of the oxidation-reduction unit, and specifically.

DETAILED DESCRIPTION OF THE PREFERRED EMBODIMENTS

First Embodiment

Figure 1:
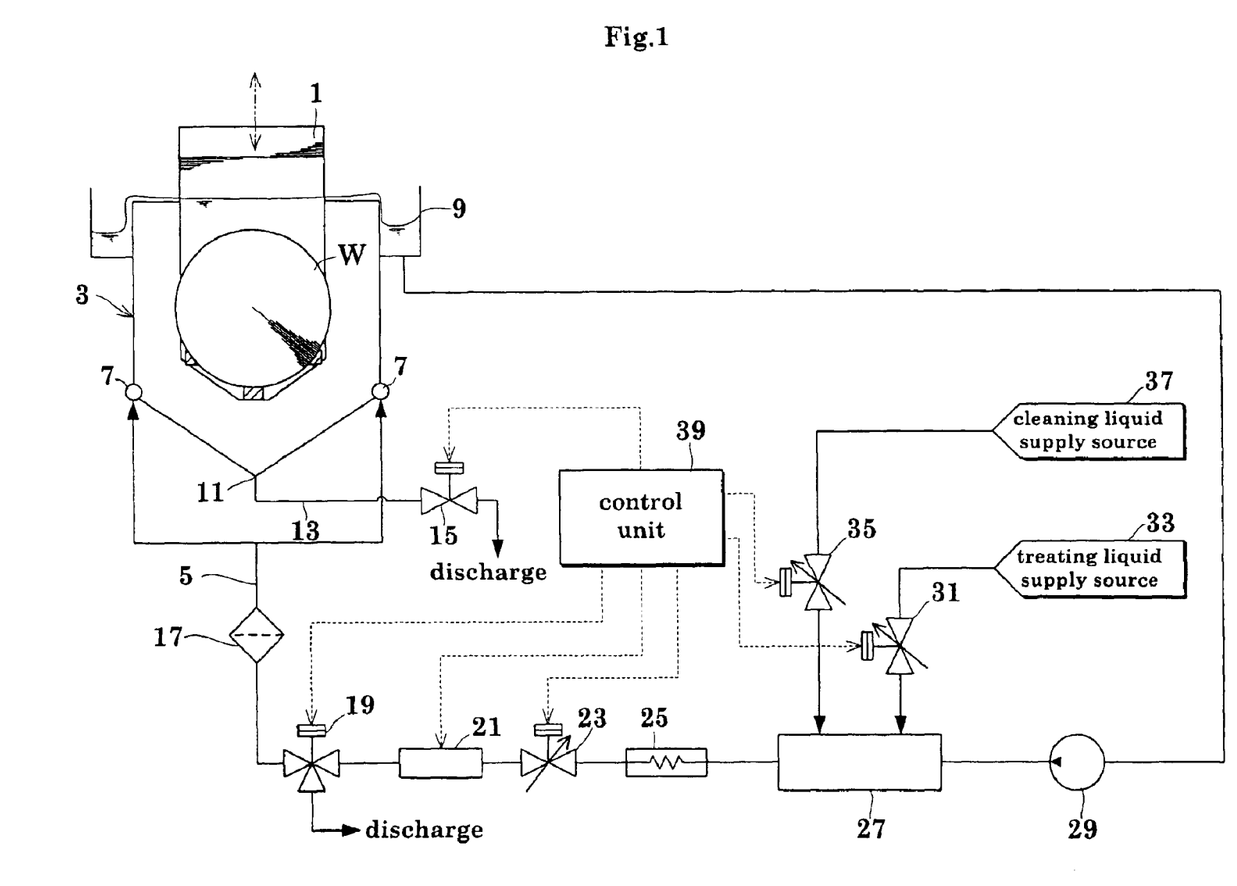
FIG. 1 is a block diagram showing a schematic configuration of a first embodiment of the substrate-treating apparatus for carrying out the metal ion-removing method.

FIG. 1 shows an embodiment of the invention, which is a block diagram showing a schematic configuration of the first embodiment of the substrate-treating apparatus for carrying out the inventive method of removing a metal ion.

The substrate-treating apparatus comprises a holding arm 1, a treating vessel 3 and a supply piping 5. The holding arm 1 is so configured that it can hold a plurality of substrates W to be treated and move up and down between a certain position above the treating vessel 3 (a standby position) and an immersion position as shown in FIG. 1 (a treatment position). In addition, the holding arm 1 is so configured that it can move in the horizontal direction from the standby position to a cleaning vessel (not shown).

The treating vessel 3 comprises, at its bottom portion, a filling pipe 7 through which the treating liquid is injected. Around the upper portion of the vessel 3, a recovery vessel 9 is provided so as to recover and discharge the overflowing treating liquid. To the filling pipe 7, one end of the supply piping 5 is connected, while the other end of the piping 5 is connected to the recovery vessel 9. The valley-shaped bottom portion of the treating vessel 3 is provided with a discharge port 11 for discharging the treating liquid, with which a discharge pipe 13 is connected and communicated. In the discharge pipe 13, an on-off valve 15 is installed.

In the order from downstream to upstream, the supply piping 5 is equipped with a filter 17, a three-way valve 19, an oxidation-reduction unit (with a column electrode) 21, a control valve 23, a heater 25, a mixing valve 27, and a pump 29. To the mixing valve 27, a treating liquid supply source 33 and a cleaning liquid supply source 37 are connected via a control valves 31 and 35, respectively.

A control unit 39 is provided so as to control the control valves 21, 31 and 35 whereby the closing and opening of each valve and the flow rate of the treating or cleaning liquid are controlled. The control unit 39 also controls the closing and opening of the on-off valve 15 and the three-way valve 19. The control unit 39 also controls the voltage applied to the oxidation-reduction unit 21 (the first and second voltages as described below).

Figure 2:
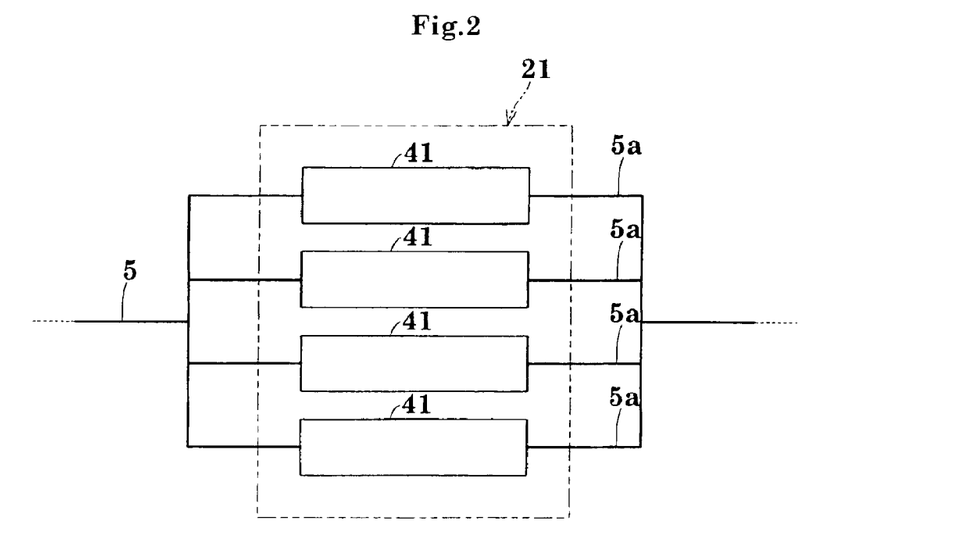
FIG. 2 is a diagram showing branch pipes that branch from the supply piping.
Figure 3A:
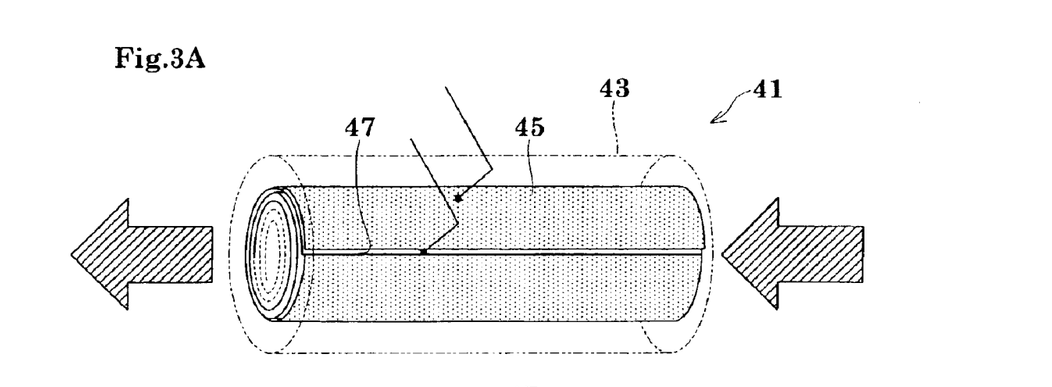
FIG. 3A is a perspective view of the unit.
Figure 3B:
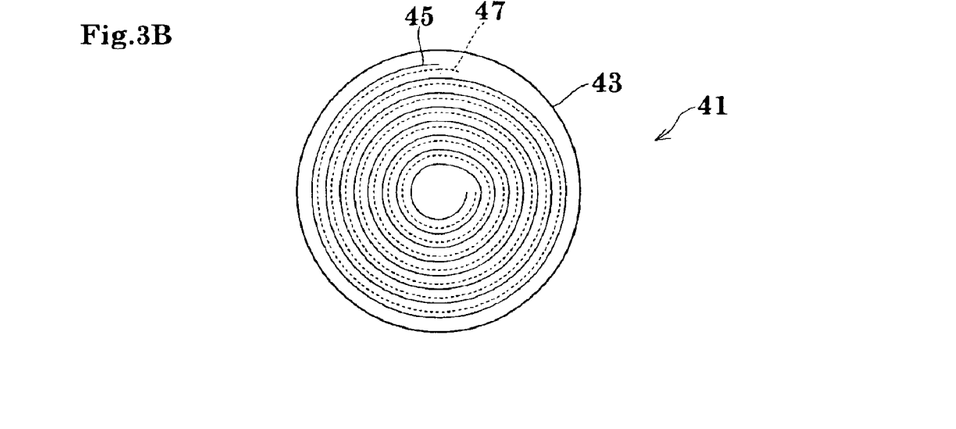
FIG. 3B is a front view thereof.

Referring to FIGS. 2, 3A and 3B, the oxidation-reduction unit 21 is described below. FIG. 2 is a diagram showing branch pipes that branch from the supply piping. FIGS. 3A and 3B are drawings showing a schematic configuration of the oxidation-reduction unit, and specifically, FIG. 3A is a perspective view of the unit, and FIG. 3B is a front view thereof.

For example, the oxidation-reduction unit 21 as mentioned above is installed in the supply piping 5, which branches into four branch pipes 5a. A unit 41 as described below is installed in each of the branch pipes 5a. The distribution of the unit 41 to each branch pipe 5a can prevent the placement of the unit 41 with a high flow resistance from having an adverse effect.

The unit 41 comprises a case 43, a first electrode 45 and a second electrode 47. The first and second electrodes 45 and 47 are each made of a rectangular metal and placed close to each other. If viewed from the passage direction, the first and second electrodes 45 and 47 are each in a spiral shape. From the control unit 39, the first voltage or the second voltage higher than the first voltage is applied between the first and second electrodes 45 and 47.

The first and second electrodes 45 and 47 correspond to the electrode in the inventive method or apparatus.

Figure 4:
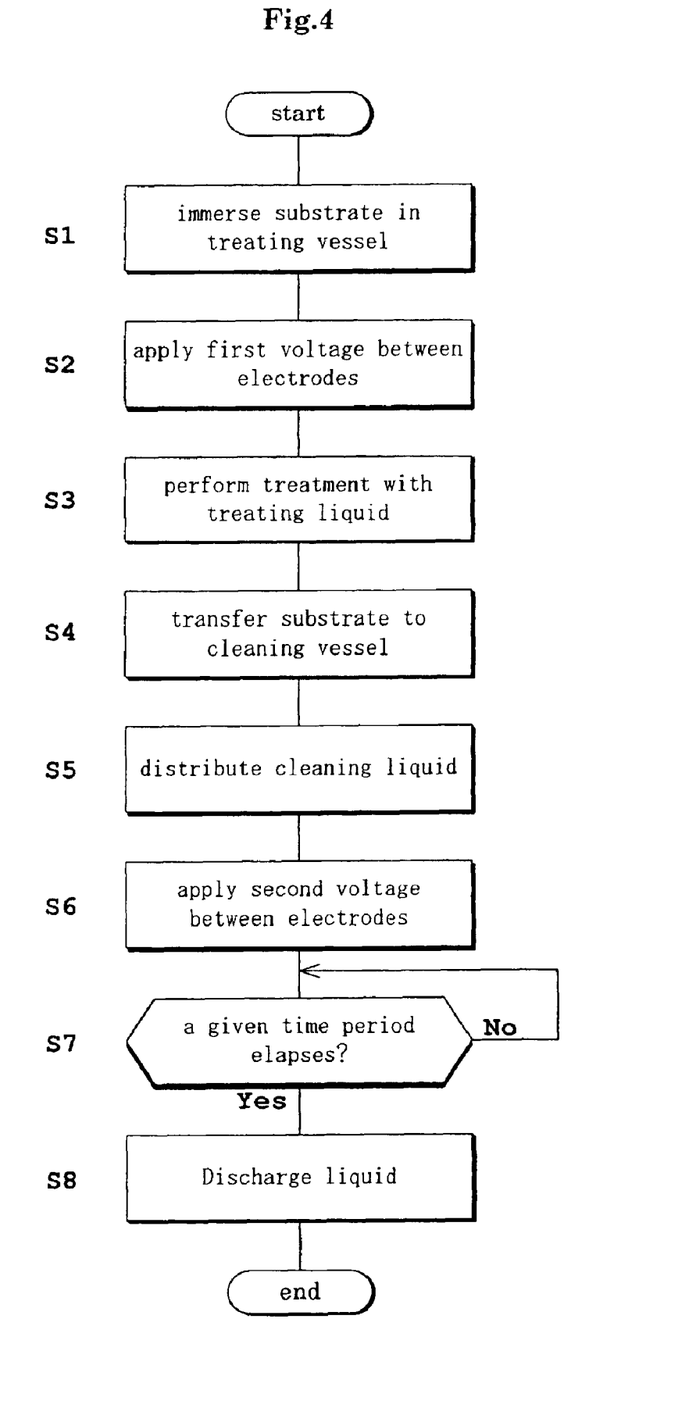
FIG. 4 is a flow chart showing the steps of the treatment.

Referring to FIG. 4, the operation of the substrate-treating apparatus in the above configuration is described below. FIG. 4 is a flow chart showing the steps of the treatment.

In the operation, the control unit 39 controls the control valve 31 so that the treating liquid is supplied from the treating liquid supply source 33 to the supply piping 5 at a certain flow rate, and it also allows the pump 29 to operate so that the treating liquid is circulated. In such a process, the heater 25 may be allowed to operate for the purpose of heating the treating liquid to a certain temperature.

Step S1

The substrates W are immersed in the treating vessel 3. The holding arm 1 on which the substrates W are held is moved from the standby position to the treatment position so that the substrates W are placed in the treating vessel 3.

Step S2

Simultaneously with or before the step S1, the first voltage is applied across the electrodes. For example, the second electrode 47 is kept at the ground level, and a voltage of +0.035 V is applied to the first electrode 45, when $10^{-10}$ mol/l of $Cu^{2+}$ is reduced.

Step S3

The treating liquid is circulated for a certain time period so that the substrates W are treated with the treating liquid. In this step, a metal dissolves as an ion from the substrates W, which are immersed in the treating vessel 3, into the circulated treating liquid. The dissolving metal ion may vary depending on the type of the substrate W and the treatment. For example, a copper ion dissolves when copper-plated substrates W are treated.

In the unit 41, a voltage is applied between the first and second electrodes 45 and 47, so that an oxidation-reduction reaction (an electron-transferring reaction) occurs in the space between the electrodes 45 and 47. In the reaction, the metal ion, which dissolves in the treating liquid and is circulated, is reduced to the metal, which is deposited and trapped on at least one of the first and second electrodes 45 and 47.

Figure 5:
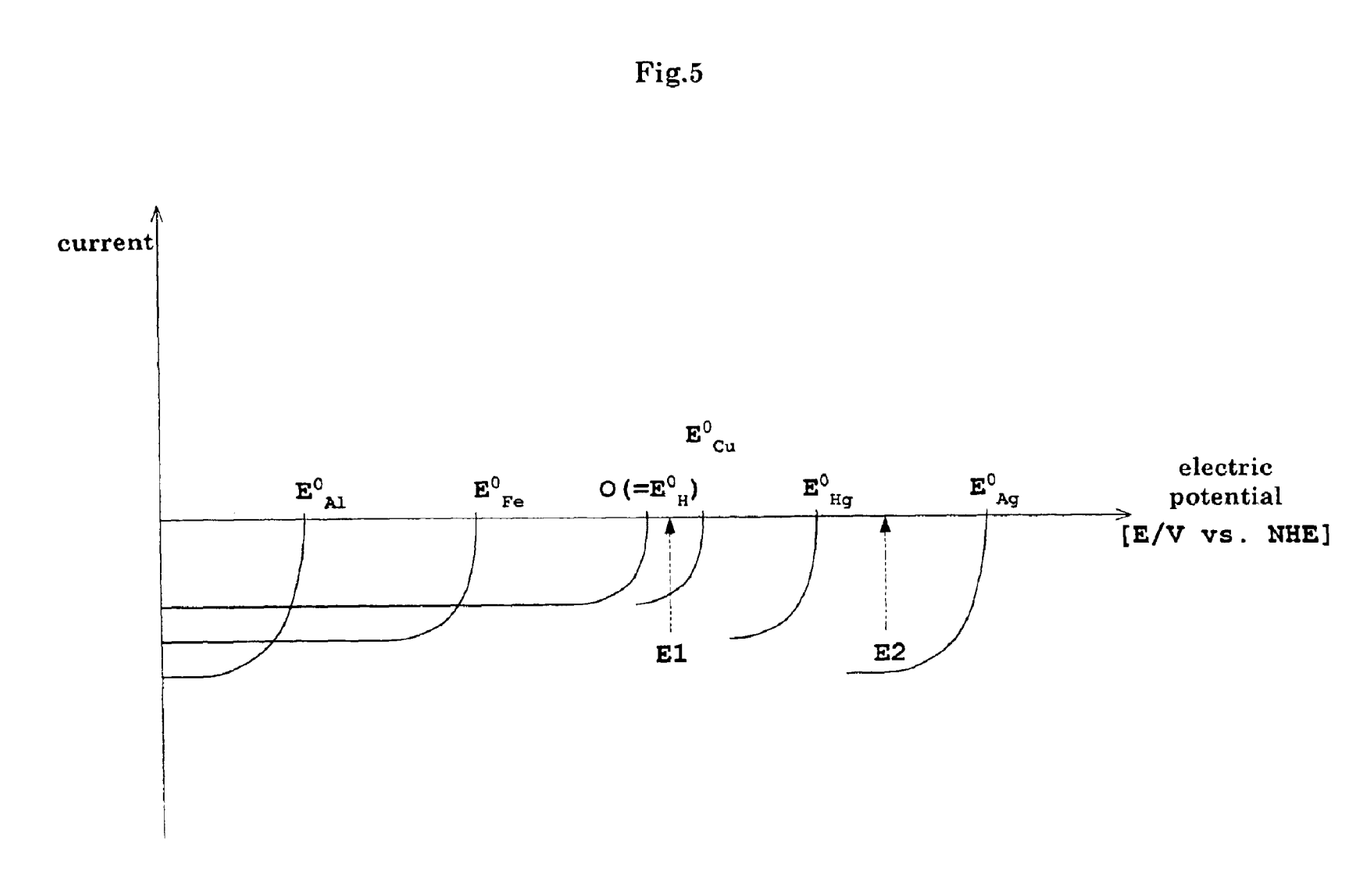
FIG. 5 is a graph schematically showing a current/oxidation-reduction potential curve.

For example, if the first voltage is set so as to provide an inter-electrode potential higher than 0 E/V vs. NHE and provide an electric potential lower than the standard potential of the metal to be deposited (copper (Cu)), the copper (Cu) ion can be deposited from the treating liquid. Referring to FIG. 5, the mechanism is described below. FIG. 5 is a graph schematically showing a current-potential curve.

When the inter-electrode potential is set higher than 0 E/V vs. NHE and set at E1 lower than the standard potential of copper (Cu), the metal to be deposited, the copper (Cu) ion is reduced so that the copper is deposited on the negative electrode ($2Cu^{2+}+4e \rightarrow 2Cu$). When the applied potential is further lower than E1, a complex constituted of the copper ion can also be reduced, so that the copper ion can be removed from the treating liquid at an increased removal rate.

The steps S2 and S3 correspond to the deposition step in the inventive method.

Step S4

The substrates W are moved to the cleaning vessel (not shown).

The holding arm 1 is moved to the standby position and then so moved in the horizontal direction that the substrates W are transferred to the cleaning vessel.

Step S5

The cleaning liquid is circulated.

The control unit 39 closes the control valve 31 and then opens the control valve 35 so that the cleaning liquid is circulated through the supply piping 5.

Herein, the cleaning liquid is for use in discharging the metal ion. Preferably, the cleaning liquid is acid and has a high oxidation-reduction potential, so that it can easily cause the oxidation-reduction reaction as described below. Examples of such a cleaning liquid include an acid such as hydrochloric acid and ozone water.

Step S6

The second voltage is applied, which is higher than the first voltage applied in the step S2. For example, the second voltage is applied so as to provide a potential of E2 higher than $E^0_{Cu}$, which is a potential of the copper (Cu) ion at the time when the copper is deposited.

In the step S2, for example, the second electrode 47 is kept at the ground level, and a voltage of +0.035 V is applied to the first electrode 45. In the step S6, for example, the first electrode 45 is kept at the ground level, and a voltage of +0.635 V higher than the first voltage corresponding to the potential E1 is applied to the second electrode 47.

In this step, the oxidation-reduction reaction occurs again in the unit 41 so that the metal deposited on one or both of the first and second electrodes 45 and 47 is oxidized to the ion, which dissolves in the cleaning liquid.

Step S7

While the cleaning liquid is circulated, the step of the treatment is changed depending on whether a given time period elapses or not.

Specifically, if a given time period elapses, which is enough for the metal ion to dissolve from the first electrode 45 and/or the second electrode 47 into the cleaning liquid, the step goes to the step S8.

The steps S5 to S7 correspond to the ionization step in the inventive method.

Step S8

The on-off valve 15 is opened, and the cleaning liquid is discharged from the treating vessel 3. The three-way valve 19 is shifted to the discharge way, and the cleaning liquid that contains the metal ion is discharged.

In the steps S2 and S3, the first voltage is applied via the first and second electrodes 45 and 47 to the treating liquid so that the oxidation-reduction reaction occurs and the metal ion is deposited from the treating liquid as the metal onto one or both of the first and second electrodes 45 and 47. In the next steps S5 to S7, the second voltage higher than the first voltage is applied while the cleaning liquid is circulated, so that the metal on the electrode(s) is oxidized to the ion and the metal released from the first and second electrodes 45 and 47 is flushed and discharged with the cleaning liquid. Thus, the metal ion is recovered and removed from the treating liquid so that the metal ion can be prevented from having an adverse effect on the substrates.

Second Embodiment

Figure 6:
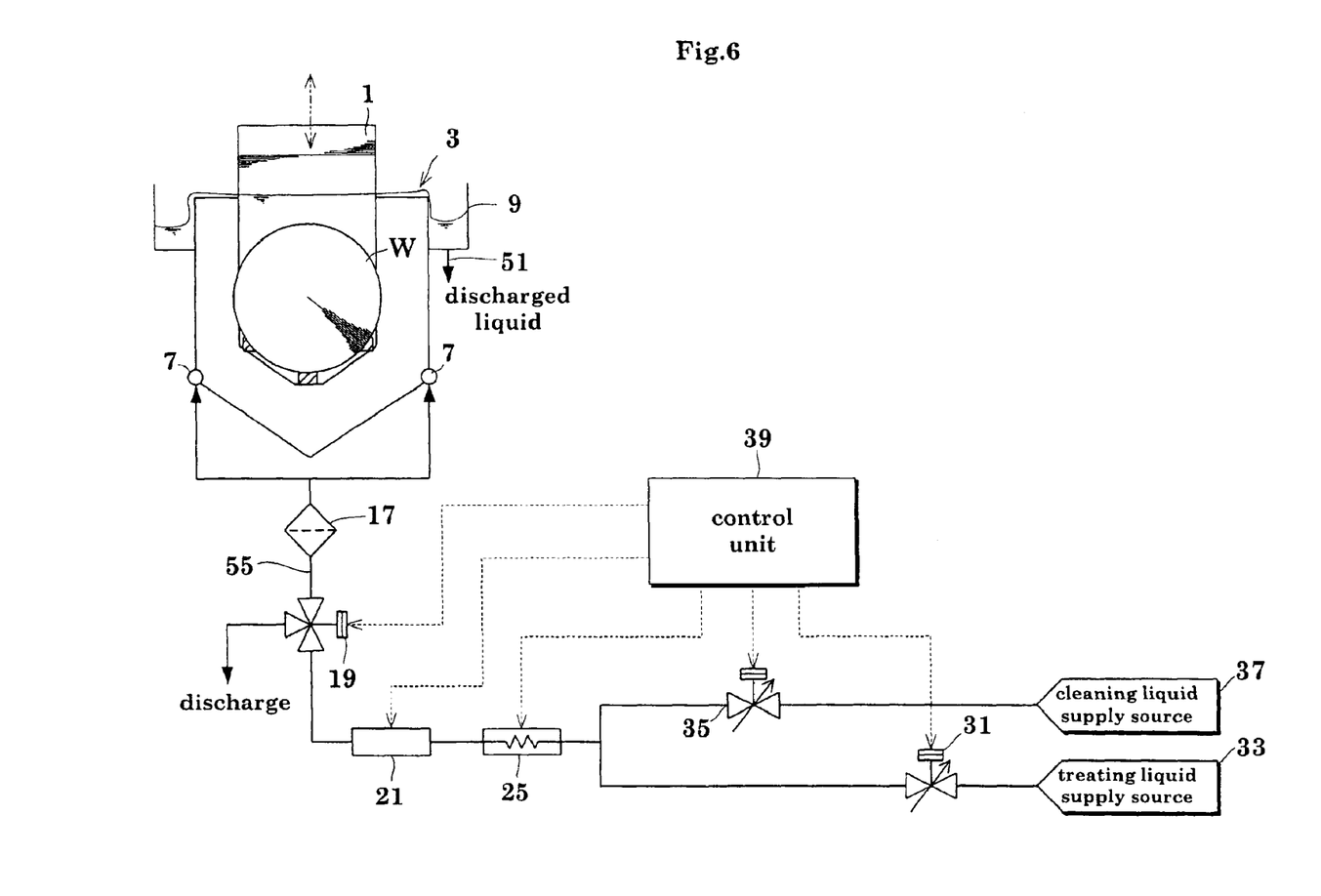
FIG. 6 is a block diagram showing a schematic configuration of a second embodiment of the substrate-treating apparatus.

FIG. 6 shows another embodiment of the invention, which is a block diagram showing a schematic configuration of the second embodiment of the substrate-treating apparatus for carrying out the inventive method of removing a metal ion.

The apparatus of this embodiment differs from that of First Embodiment in that the treating liquid is supplied for the treatment of the substrates W and then discharged without being circulated. The same elements as in First Embodiment are represented by the same numerals, and the detailed description of such elements will be omitted.

The recovery vessel 9 is equipped with a discharge pipe 51 for discharging the recovered treating liquid. One end of a supply piping 55 is communicated with the filling pipe 7. The other end portion of the supply piping 55 branches, and the branches are communicated with a treating liquid supply source 33 and a cleaning liquid supply source 37, respectively.

In the substrate-treating apparatus in such a configuration, the control valve 35 is closed, and the control valve 31 is opened, so that the treating liquid is fed at a certain flow rate from the treating liquid supply source 33 through the supply piping 55 to the treating vessel 3. The overflowing treating liquid is recovered into the recovery vessel 9 and then discharged via the discharge pipe 51. In this process, the first voltage is applied to the oxidation-reduction unit 21 similarly to First Embodiment, so that the metal or the metal ion is recovered from the treating liquid by the oxidation-reduction reaction.

After the substrates W are lifted from the treating vessel 3, the control valve 31 is closed, and the control valve 35 is opened, so that the cleaning liquid is supplied to the supply piping 55. In this process, the second voltage higher than the first voltage is applied to the oxidation-reduction unit 21, so that the metal deposited in the oxidation-reduction unit 21 dissolves as the metal ion into the cleaning liquid and is discharged through the discharge pipe 51.

The substrate-treating apparatus in such a configuration can achieve the same effect and advantage as in First Embodiment.

Third Embodiment

Figure 7:
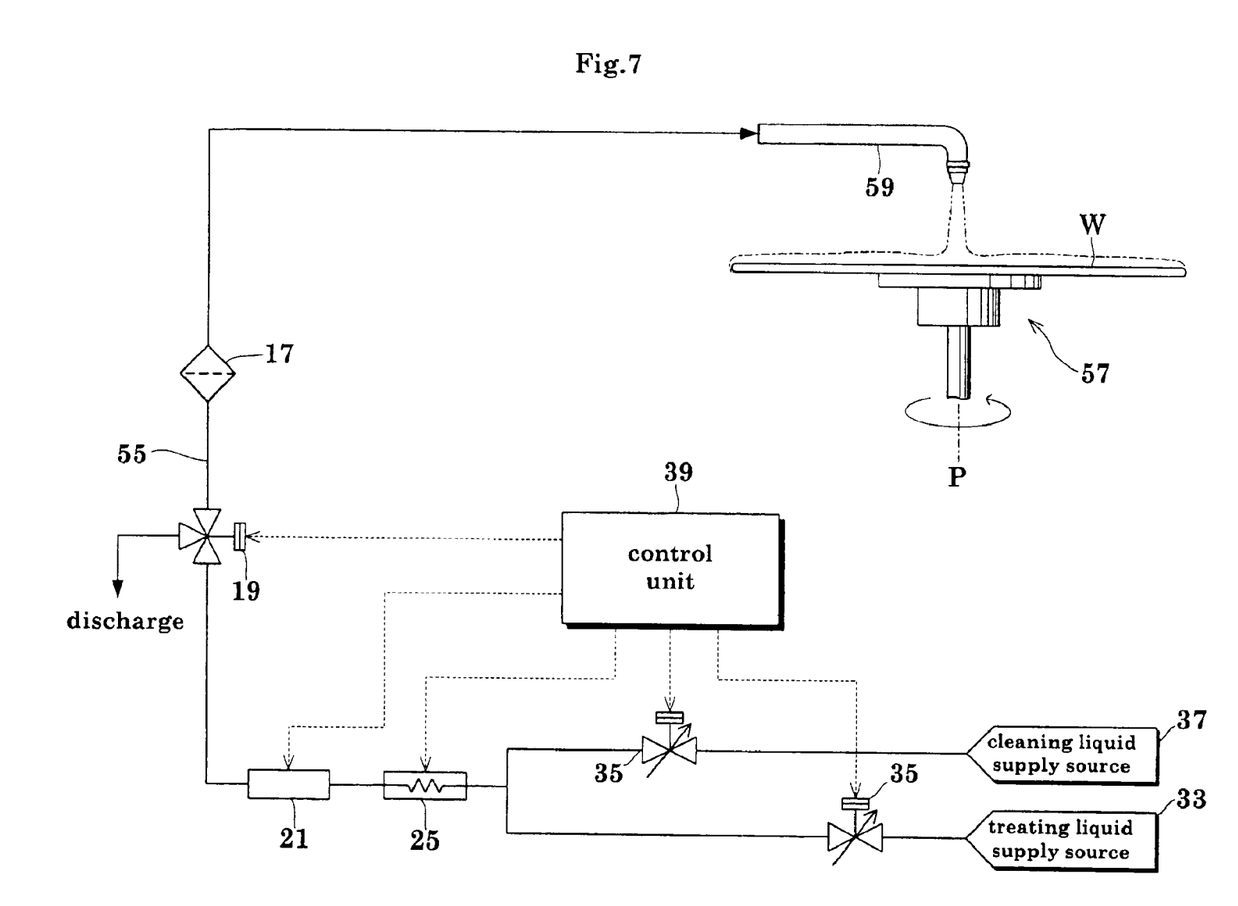
FIG. 7 is a block diagram showing a schematic configuration of a third embodiment of the substrate-treating apparatus.

FIG. 7 shows yet another embodiment of the invention, which is a block diagram showing a schematic configuration of the third embodiment of the substrate-treating apparatus for carrying out the inventive method of removing a metal ion.

In First or Second Embodiment, provided is a so-called "batch type" apparatus in which a plurality of substrates W are treated at the same time. In this embodiment, provided is a so-called "sheet-fed type" apparatus with which the substrate W is treated one by one. The same elements as in First or Second Embodiment are represented by the same numerals, and the detailed description of such elements will be omitted.

In this apparatus, the substrate W is held on a rotary supporting unit 57 in a horizontal position and treated. The rotary supporting unit 57 comprises a motor and the like (not shown) and rotates the substrate W around the vertical rotation axis P. Above the rotary supporting unit 57, a nozzle 59 is provided in such a manner that it can swingably move between a standby position and a treatment position (as shown in FIG. 6) when the substrate W is transferred between substrate-carrying means (not shown) and the rotary supporting unit 57.

The nozzle 59 is communicated with the supply piping 55, and the treating liquid or the cleaning liquid is selectively supplied. The treating liquid is discharged from the nozzle 59 and supplied onto the surface of the substrate W and then ejected via a recovery cup (not shown).

In the substrate-treating apparatus in such a configuration, the substrate W is mounted and sucked onto the rotary supporting unit 57 and rotated while the treating liquid is supplied from the nozzle 59. This process is maintained for a certain time period when the substrate W is treated. In this process, the first voltage is applied to the oxidation-reduction unit 21 as described above so that the metal and the metal ion is deposited and recovered from the treating liquid.

The substrate W is then transferred from the rotary supporting unit 57, and then a dummy substrate W (a non-product substrate) is mounted on the rotary supporting unit 57. In this state, the second voltage higher than the first voltage is applied to the oxidation-reduction unit 21 while the cleaning liquid is supplied to the supply piping 55. In this process, the metal deposited in the oxidation-reduction unit 21 dissolves as the metal ion into the cleaning liquid and is discharged outside.

The substrate-treating apparatus in such a configuration can achieve the same effect and advantage as in First or Second Embodiment.

Figure 8A:
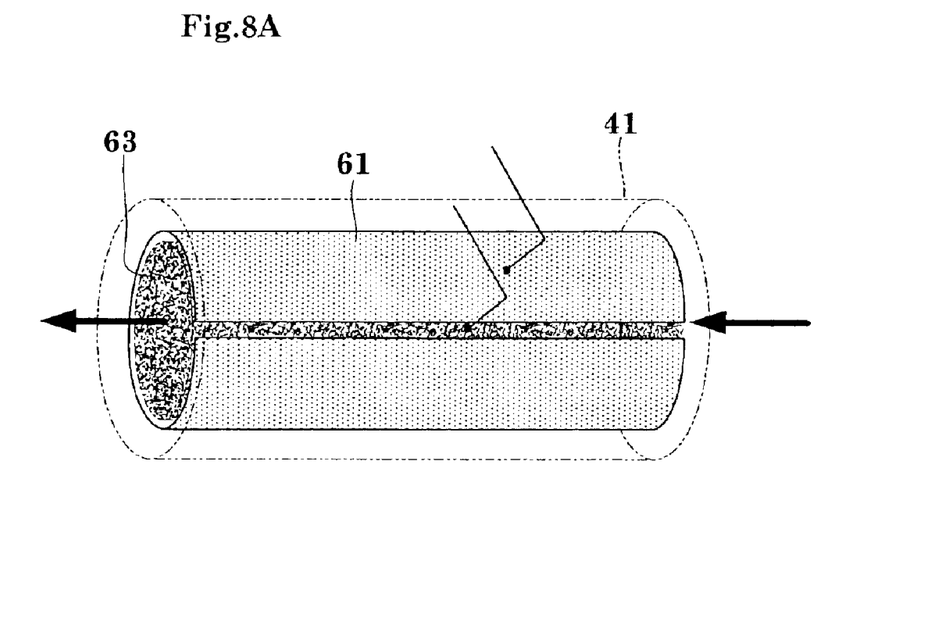
FIG. 8A is a perspective view of the unit.
Figure 8B:
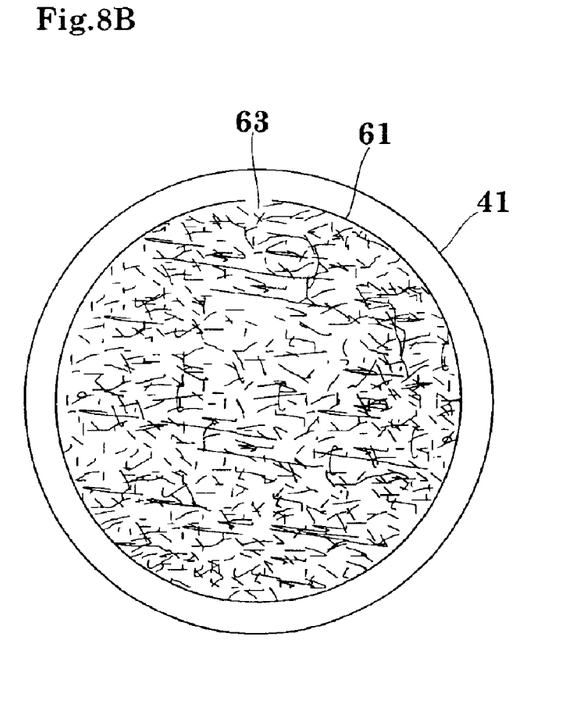
FIG. 8B is a front view thereof.

Alternatively, the unit 41 constituting the oxidation-reduction unit 21 may have another structure as shown in FIGS. 8A and 8B, which are diagrams showing a modification of the oxidation-reduction unit, and specifically, FIG. 8A is a perspective view of the unit, and FIG. 8B is a front view thereof.

The unit 41 comprises a first electrode 61 and a second electrode 63. The first electrode 61 is formed of a rectangular metal sheet, which is rolled into a ring shape. The second electrode 63 is formed of fibers. The first electrode 61 is so formed as to house the second electrode 63. There is a small space between the first electrode 61 and the outer face of the second electrode 63, although such a small space is not clearly shown in FIG. 8B.

In the unit 41 with such a structure, the second electrode 63 has a very large surface area, which provides a large deposition area for the metal ion, so that the metal ion can efficiently be recovered.

The above embodiments are not intended to limit the scope of the invention. For example, modifications and variations are provided as follows:

(1) The unit 41 may comprise a pair of spirally shaped electrodes or mesh electrodes;

(2) In place of four branch pipes 5a, one pipe with one unit 41 may be used in the supply piping 5 or 55, or five or more branch pipes 5a may be used; and/or (3) The inventive method of removing the metal ion may be carried out using any apparatus other than the substrate-treating apparatus in the above-described configuration.

The invention may be embodied in other specific forms without departing from the spirit or essential attributes thereof and, accordingly, reference should be made to the appended claims, rather than to the foregoing specification, as indicating the scope of the invention.

What is claimed is:

1. A method of removing a metal ion from a treating liquid for use in treating a substrate, comprising the steps of:
    applying a first voltage via an electrode to the treating liquid that flows in a supply piping, so that deposition can occur; and
    applying a second voltage higher than the first voltage to the electrode while distributing a cleaning liquid to the supply piping, so that ionization can occur.

2. The method according to claim 1, wherein the cleaning liquid is an acid liquid having a high oxidation-reduction potential.

3. The method according to claim 1, wherein the first voltage is set so as to provide an inter-electrode potential higher than 0 E/V vs. NHE.

4. The method according to claim 2, wherein the first voltage is set so as to provide an inter-electrode potential higher than 0 E/V vs. NHE.

5. The method according to claim 3, wherein the first voltage provides an electric potential lower than a standard potential of the metal to be deposited, and the second voltage provides an electric potential higher than a standard potential of the deposited metal.

6. The method according to claim 4, wherein the first voltage provides an electric potential lower than a standard potential of the metal to be deposited, and the second voltage provides an electric potential higher than a standard potential of the deposited metal.

7. An apparatus for treating a substrate, in which a treating liquid is supplied to the substrate to be treated and which comprises:
    a supply piping for supplying the treating liquid to the substrate;
    first supply means for supplying the treating liquid to the supply piping;
    second supply means for supplying a cleaning liquid to the supply piping; and
    an electrode for applying a voltage to the treating liquid in the supply piping, wherein
    a first voltage is applied via the electrode to the treating liquid that is supplied from the first supply means to the supply piping, and then a second voltage higher than the first voltage is applied to the electrode while the cleaning liquid is distributed from the second supply means to the supply piping.

8. The apparatus according to claim 7, wherein the supply piping branches into a plurality of branch pipes in each of which the electrode is provided.

9. The apparatus according to claim 7, wherein the cleaning liquid is an acid liquid having a high oxidation-reduction potential.

10. The apparatus according to claim 7, further comprising a treating vessel with which the supply piping is communicated and connected and in which the substrate is immersed, wherein the electrode is placed in the supply piping.

11. The apparatus according to claim 7, wherein the treating vessel is equipped with a recovery vessel for recovering the overflowing treating liquid, and the supply piping is communicated and connected with the recovery vessel so that the recovered treating liquid is fed back to the treating vessel.

12. The apparatus according to claim 10, wherein the treating vessel is equipped with a recovery vessel for recovering the overflowing treating liquid and a discharge pipe for discharging the recovered treating liquid from the recovery vessel.

13. The apparatus according to claim 7, wherein the first voltage is set so as to provide an inter-electrode potential higher than 0 E/V vs. NHE.

14. The apparatus according to claim 8, wherein the first voltage is set so as to provide an inter-electrode potential higher than 0 E/V vs. NHE.

15. The apparatus according to claim 9, wherein the first voltage is set so as to provide an inter-electrode potential higher than 0 E/V vs. NHE.

16. The apparatus according to claim 10, wherein the first voltage is set so as to provide an inter-electrode potential higher than 0 E/V vs. NHE.

17. The apparatus according to claim 11, wherein the first voltage is set so as to provide an inter-electrode potential higher than 0 E/V vs. NHE.

18. The apparatus according to claim 12, wherein the first voltage is set so as to provide an inter-electrode potential higher than 0 E/V vs. NHE.

19. The apparatus according to claim 13, wherein the first voltage provides an electric potential lower than a standard potential of the metal to be deposited, and the second voltage provides an electric potential higher than a standard potential of the deposited metal.

20. The apparatus according to claim 14, wherein the first voltage provides an electric potential lower than a standard potential of the metal to be deposited, and the second voltage provides an electric potential higher than a standard potential of the deposited metal.

* * * * *